US009674523B2

(12) United States Patent
Hsu (10) Patent No.: US 9,674,523 B2
(45) Date of Patent: Jun. 6, 2017

(54) METHODS AND APPARATUS FOR TRANSCODING DIGITAL VIDEO (71) Applicant: Advanced Micro Devices, Inc., Sunnyvale, CA (US)

(72) Inventor: Wei-Lien Hsu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1123 days.

(21) Appl. No.: 13/676,211

(22) Filed: Nov. 14, 2012

(65) Prior Publication Data
US 2014/0133573 A1    May 15, 2014

(51) Int. Cl.
*H04N 7/12*    (2006.01)
*H04N 11/02*   (2006.01)
*H04N 11/04*   (2006.01)
*H04N 19/40*   (2014.01)
*H04N 19/176*  (2014.01)
*H04N 19/513*  (2014.01)
*H04N 19/137*  (2014.01)
*H04N 19/48*   (2014.01)

(52) U.S. Cl.
CPC ..... *H04N 19/00472* (2013.01); *H04N 19/137* (2014.11); *H04N 19/176* (2014.11); *H04N 19/40* (2014.11); *H04N 19/48* (2014.11); *H04N 19/513* (2014.11)

(58) Field of Classification Search
CPC ........... H04N 19/00472; H04N 19/176; H04N 19/137; H04N 19/48; H04N 19/513; H04N 19/40
USPC ....................................... 375/240.01–240.29
See application file for complete search history.

(56) References Cited

U.S. PATENT DOCUMENTS

| 2003/0081676 A1* | 5/2003 | Lin et al. ............. 375/240.12 |
| 2004/0086042 A1* | 5/2004 | Kim et al. ............. 375/240.08 |
| 2005/0058203 A1* | 3/2005 | Fernandes ............. 375/240.16 |

(Continued)

OTHER PUBLICATIONS

Wang, Chou-Chen et al.; Efficient Algorithm for Early Detecting All-Zero DCT Blocks in H.264 Video Encoding; International Conference on Information Science, Signal Processing and Their Applications (ISSPA) 2010.

*Primary Examiner* — Andy Rao
*Assistant Examiner* — Jared Walker
(74) *Attorney, Agent, or Firm* — Faegre Baker Daniels LLP (57) ABSTRACT Methods and apparatus for transcoding digital video data are disclosed. In an embodiment, a transcoder (300) decodes a digital video block (304) using a first coding scheme, such as 8×8 MPEG-2/4, to produce domain transformed data (306) and a motion vector (308). The transcoder (300) then estimates an energy level of each sub-block in the digital video block (304) in the frequency domain (as opposed to the spatial domain), thereby reducing or eliminating the need for motion compensation. For each sub-block with an estimated energy level below a desired threshold (e.g., likely an all-zero sub-block), the transcoder (300) transcodes the sub-block by converting the motion vector (308) from the first coding scheme (e.g., MPEG-2/4) to the second coding scheme (e.g., H.264) (e.g., convert 8×8 MPEG-2/4 vector to 4×4 H.264 vector or reuse the MPEG-2/4 vector if all four sub-blocks are AZB and coding in H.264 as an 8×8 block). The transcoded sub-block may then be used (e.g., stored or transmitted).

46 Claims, 8 Drawing Sheets

(56) References Cited

U.S. PATENT DOCUMENTS

| | | | |
|---|---|---|---|
| 2007/0201554 A1* | 8/2007 | Sihn .................. | 375/240.12 |
| 2010/0067580 A1* | 3/2010 | Sachdeva et al. ....... | 375/240.16 |
| 2010/0296581 A1* | 11/2010 | Metoevi ........... | H04N 19/00472 |
| | | | 375/240.16 |

* cited by examiner

METHODS AND APPARATUS FOR TRANSCODING DIGITAL VIDEO

TECHNICAL FIELD

The present disclosure relates in general to video data, and, in particular, to methods and apparatus for transcoding digital video data.

BACKGROUND

High quality digital video data (e.g., video files or streaming data) are relatively large in size. As a result, transmitting and storing digital video consumes a significant amount of bandwidth and memory. Typically, devices compress a digital video signal prior to transmission and/or storage in order to reduce the size of the digital video signal and thereby conserve bandwidth and memory. Accordingly, the digital video may require decompression prior to playback.

Many different coding schemes exist for compressing and decompressing digital video. Some coding schemes reduce the size of the digital video more than other coding schemes, but typically these coding schemes require more computational power to perform the compression and/or decompression than other, often older, compression schemes. Because of this tradeoff, and the chronological evolution of coding schemes, different devices often use different coding schemes to compress or decompress a digital video. For example, a video camera may use the MPEG-2 coding scheme to record videos, and a television may use the H.264 coding scheme to display videos. As a result, the digital video may need to be converted from one coding scheme to another coding scheme (i.e., transcoded) to maintain compatibility between different devices.

Typically, a transcoder will decompress a compressed digital video signal using one coding scheme and then recompress the now-uncompressed digital video using a different coding scheme. For example, a device may decompress a digital video using the MPEG-2 coding scheme and then recompress the digital video using the H.264 coding scheme. However, this brute force approach requires a significant amount of computational power, because the digital video signal is completely decompressed and then completely recompressed.

Some existing transcoding schemes detect the presence of all-zero blocks (AZB) to reduce the complexity of encoding. However, existing methods detect all-zero blocks by comparing a sum of absolute differences (SAD) to a predefined threshold after performing motion estimation. Motion estimation consumes a significant amount of computational power. In many cases, motion estimation consumes the majority of the computational power used in the video encoding process.

DETAILED DESCRIPTION OF THE PREFERRED EMBODIMENTS

Briefly, methods and apparatus for transcoding digital video data are disclosed. In an embodiment, a decoder (e.g., an MPEG decoder) is structured to decode a digital video block (e.g., an 8×8 MPEG block) to produce domain transformed data (e.g., DCT data) and a first motion vector (e.g., an MPEG motion vector). A sub-block energy level estimator operatively coupled to the decoder is structured to estimate an energy level of a sub-block of the digital video block (e.g., a 4×4 sub-block inside an 8×8 MPEG block) using the domain transformed data. A vector converter operatively coupled to the sub-block energy level estimator is structured to convert the first motion vector (e.g., an MPEG motion vector) to a second motion vector associated with a second different coding scheme (e.g., an H.264 motion vector) if the energy level is below a certain threshold (e.g., if the sub-block is likely an all-zero sub-block). And, a data provider (e.g., a transmitter and/or a memory) operatively coupled to the vector converter is structured to provide the second motion vector.

Among other advantages, eliminating the need for motion estimation and residue determination by converting the motion vector from a first coding scheme to a motion vector in a second coding scheme for each low energy sub-block (e.g., likely all-zero sub-block) saves computational power during the transcoding process. Saving computational power during the transcoding process allows higher quality digital video to be displayed in real-time with fewer processing resources.

In one example, the sub-block energy level estimator is structured to estimate the energy level of the sub-block by estimating the energy level of the sub-block in a frequency domain. In one example, the sub-block energy level estimator is structured to estimate the energy level of the sub-block without calculating a motion compensation value associated with the digital video block. In one example, the sub-block energy level estimator is structured to estimate the energy level of the sub-block by determining an overall sum-of-squared differences (SSD) value for the digital video block. In one example, the sub-block energy level estimator is structured to estimate the energy level of the sub-block by determining a plurality of individual sum-of-squared differences (SSD) values for a plurality of sub-blocks inside the digital video block based on the overall sum-of-squared differences (SSD) value. In one example, the sub-block energy level estimator is structured to estimate the energy level of the sub-block by determining if an individual sum-of-squared differences (SSD) value in the plurality of individual sum-of-squared differences (SSD) values is indicative of an all-zero sub-block. In one example, the data provider is structured to transmit the digital video block encoded using the second coding scheme. In one example, a receiver is structured to receive the digital video block, a decoder is structured to decode the digital video block using the second coding scheme, and a display is structured to display the digital video block.

In another embodiment, a decoder (e.g., an MPEG-2/4 decoder) is structured to decode a digital video block having a first size using a first coding scheme (e.g., decode an 8×8 MPEG-2/4 block) to produce domain transformed data (e.g., DCT data) and a first motion vector (e.g., MPEG-2/4 motion vector). An all-zero block (AZB) classifier operatively coupled to the motion vector retriever is structured to classify the digital video block as an all-zero block or a non-all-zero block (e.g., check MPEG-2/4 flag). A memory operatively coupled to the all-zero block classifier is structured to store data indicative of the first motion vector in association with the digital video block in a second different coding scheme if the digital video block is classified as the all-zero block (e.g., save this entire 8×8 MPEG-2/4 block as an 8×8 H.264 block and reuse the MPEG-2/4 motion vector). A block SSD calculator operatively coupled to decoder is structured to calculate an overall sum-of-squared differences (SSD) value for the digital video block (e.g., calculate SSD for 8×8 MPEG-2/4 block). A sub-block SSD calculator operatively coupled to the block SSD calculator is structured to calculate a plurality of individual sum-of-squared differences (SSD) values for a plurality of sub-blocks inside the digital video block based on the overall sum-of-squared differences (SSD) value (e.g., calculate SSD for four 4×4 sub-blocks in the frequency domain to save time by skipping motion compensation). An all-zero sub-block classifier operatively coupled to the sub-block SSD calculator is structured to determine if each individual sum-of-squared differences (SSD) value exceeds a certain threshold (e.g., determine if one or more of four 4×4 sub-blocks is an all-zero block if 4×4 SSD<4/3*Qstep^2). A vector converter operatively coupled to the all-zero sub-block classifier is structured to convert the first motion vector to a second motion vector associated with the second coding scheme for each sub-block associated with an individual sum-of-squared differences (SSD) value that does not exceed the certain threshold (e.g., convert 8×8 MPEG-2/4 vector to 4×4 H.264 vector or reuse the MPEG-2/4 vector if all four sub-blocks are AZB and coding in H.264 as an 8×8 block). An encoder (e.g., an H.264 encoder) operatively coupled to the all-zero sub-block classifier is structured to encode each sub-block using the second coding scheme for each sub-block associated with an individual sum-of-squared differences (SSD) value that exceeds the certain threshold (e.g., use full H.264 vector and residue encoding procedure for this 4×4 block). The memory, which is operatively coupled to the encoder, is structured to store data indicative of the digital video block in the second coding scheme (e.g., store data for four 4×4 H.264 blocks or one 8×8 H.264 block).

In one example, the sub-block SSD calculator is structured to calculate the plurality of individual sum-of-squared differences (SSD) values in a frequency domain. In one example, the sub-block SSD calculator is structured to calculate the plurality of individual sum-of-squared differences (SSD) values without calculating a motion compensation value. In one example, the all-zero sub-block classifier is structured to determine the threshold by multiplying a certain constant by a squared quantization value. In one example, the decoder is structured to decode an 8×8 digital video block. In one example, the decoder is structured to decode at least one of an MPEG-2 block and an MPEG-4 block. In one example, the all-zero block classifier is structured to classify the digital video block based on an all-zero block flag produced by decoding the digital video block using the first coding scheme. In one example, the memory is structured to store data indicative of the first motion vector with the digital video block in a H.264 coding scheme. In one example, the block SSD calculator is structured to calculate the overall sum-of-squared differences (SSD) value for an 8×8 digital video block. In one example, the block SSD calculator is structured to calculate the overall sum-of-squared differences (SSD) value for at least one of an MPEG-2 block and an MPEG-4 block. In one example, the all-zero sub-block classifier is structured to determine if a 4×4 sub-block is an all-zero sub-block by determining if an associated 4×4 sum-of-squared differences (SSD) value is below the certain threshold. In one example, the vector converter is structured to convert an 8×8 motion vector to a 4×4 motion vector. In one example, the vector converter is structured to convert at least one of an MPEG-2 motion vector and an MPEG-4 motion vector to an H.264 motion vector. In one example, the encoder is structured to encode a 4×4 digital video block. In one example, the encoder is structured to encode a sub-block using an H.264 encoding scheme. In one example, the memory is structured to store a 4×4 digital video block. In one example, the memory is structured to store an H.264 block.

Turning now to the drawings, and as described in detail below, one example of the presently disclosed system is a transcoder that decodes a digital video block using a first coding scheme, such as 8×8 MPEG-2/4, to produce domain transformed data and a motion vector. The transcoder then estimates an energy level of each sub-block in the digital video block in the frequency domain (as opposed to the spatial domain), thereby reducing or eliminating the need for motion compensation. For each sub-block with an estimated energy level below a desired threshold (e.g., likely an all-zero sub-block), the transcoder transcodes the sub-block by converting the motion vector from the first coding scheme (e.g., MPEG-2/4) to the second coding scheme (e.g., H.264) (e.g., convert 8×8 MPEG-2/4 vector to 4×4 H.264 vector or reuse the MPEG-2/4 vector if all four sub-blocks are AZB and coding in H.264 as an 8×8 block). The transcoded sub-block may then be used (e.g., stored or transmitted).

Figure 1:
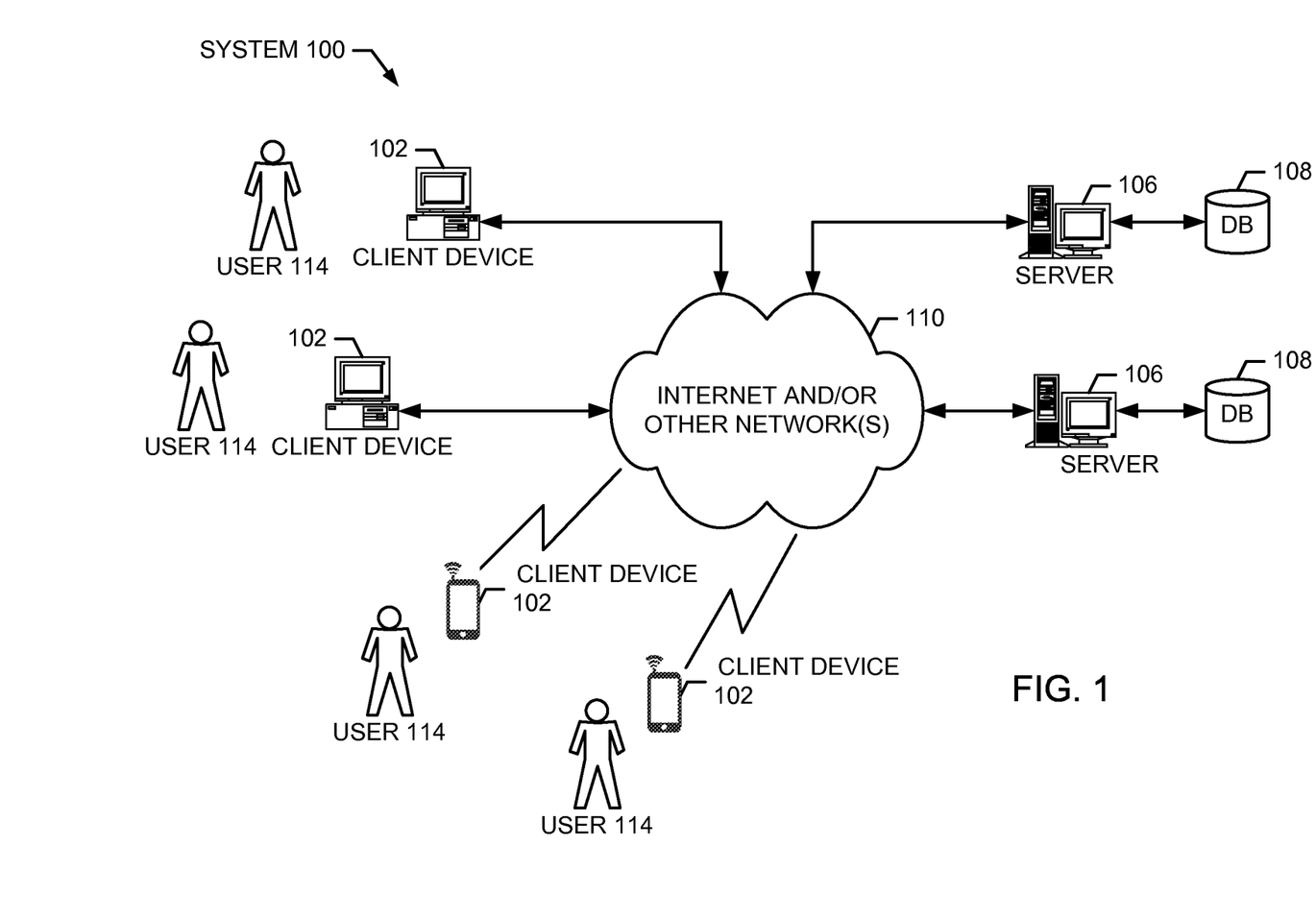
FIG. 1 is a block diagram of an example network communication system.

The present system may be used in a network communications system. A block diagram of an exemplary network communications system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

Figure 2:
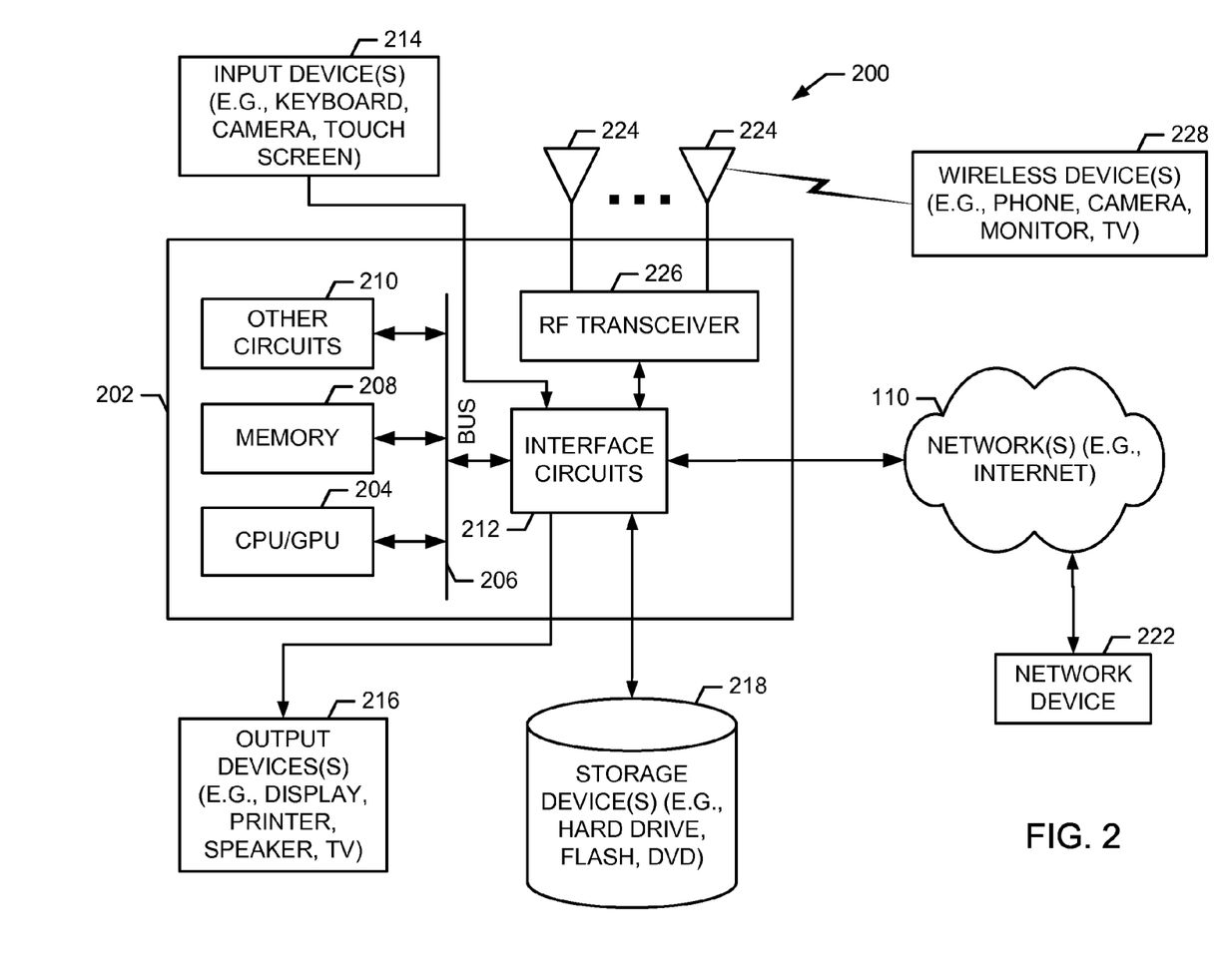
FIG. 2 is a block diagram of an example electronic device that may be used to capture, store, and/or playback digital video.

Each of the devices illustrated in FIG. 1 may include certain common aspects of many electronic devices such as microprocessors, memories, peripherals, etc. A block diagram of an example electronic device 200 that may be used to capture, store, and/or playback digital video is illustrated in FIG. 2. For example, the electrical device 200 may be a client, a server, a camera, a phone, and/or a television.

The example electrical device 200 includes a main unit 202 which may include, if desired, one or more processors 204 electrically coupled by an address/data bus 206 to one or more memories 208, other computer circuitry 210, and one or more interface circuits 212. The processor 204 may be any suitable processor or plurality of processors. For example, the electrical device 200 may include a central processing unit (CPU) and/or a graphics processing unit (GPU). The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processor 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, isopoint, camera and/or a voice recognition system.

One or more displays, printers, speakers, monitors, televisions, high definition televisions, and/or other suitable output devices 216 may also be connected to the main unit 202 via the interface circuit 212. The display 216 may be a cathode ray tube (CRTs), liquid crystal displays (LCDs), or any other type of suitable display. The display 216 generates visual displays of data generated during operation of the device 200. For example, the display 216 may be used to display web pages and/or other content received from a server. The visual displays may include prompts for human input, run time statistics, calculated values, data, etc.

One or more computer readable media such as storage devices 218 may also be connected to the main unit 202 via the interface circuit 212. For example, a hard drive, CD drive, DVD drive, flash memory, and/or other suitable storage devices may be connected to the main unit 202. The storage devices 218 may store any type of information used by the device 200. The information may be software to be executed by one or more processors 204 to perform the methods described herein, and/or the information may be data used to configure a manufacturing process to generate an apparatus (e.g., a circuit) that ultimately operates to perform the methods described herein. For example, RTL, Verilog, GDS data, and/or any other suitable data may be used to manufacture integrated circuits and/or other devices.

The electrical device 200 may also exchange data with other network devices 222 via a connection to a network. The network connection may be any type of network connection, such as an Ethernet connection, digital subscriber line (DSL), telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier and/or password may be assigned by the server.

In some embodiments, the device 200 may be a wireless device. In such an instance, the device 200 may include one or more antennas 224 connected to one or more radio frequency (RF) transceivers 226. The transceiver 226 may include one or more receivers and one or more transmitters. For example, the transceiver 226 may be a cellular transceiver. The transceiver 226 allows the device 200 to exchange signals, such as voice, video and data, with other wireless devices 228, such as a phone, camera, monitor, television, and/or high definition television. For example, the device may send and receive wireless telephone signals, text messages, audio signals and/or video signals.

Figure 3:
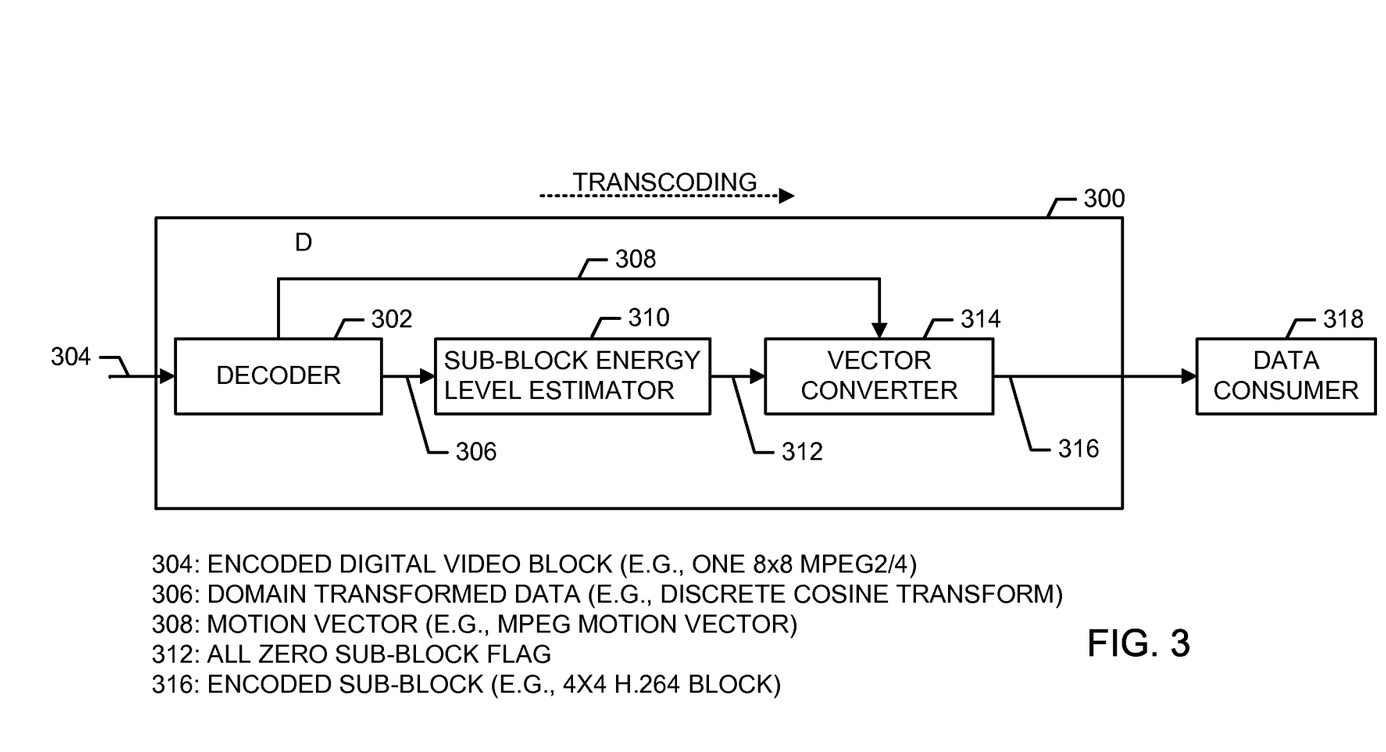
FIG. 3 is a block diagram of an example apparatus for transcoding digital video data.

A block diagram of certain elements of an example transcoder 300 for transcoding digital video data is illustrated in FIG. 3. The transcoder 300 may be implemented in hardware, software (i.e., stored on a computer readable medium and/or executed by hardware such as a CPU), or a combination of hardware and software. In one embodiment the transcoder 300 may be embodied in a GPU and/or a CPU executing software. Other suitable hardware may include one or more application specific integrated circuits (ASICs), state machines, field programmable gate arrays (FPGAs), and/or digital signal processors (DSPs).

In this example, a decoder 302 decodes an encoded digital video block 304 having a first size using a first coding scheme to produce domain transformed data 306 and a first motion vector 308. For example, the decoder 302 may decode an 8×8 MPEG block to produce discrete cosine transform (DCT) data and an MPEG motion vector. As will be appreciated by those of ordinary skill, encoded digital video block 304 may be received by a decoder 302 that only decodes a portion of the encoded video pipeline. That is, encoded digital video block may represent an partially decoded video data. For example, it is known to the inventors that in an exemplary video pipeline such as the MPEG-2 video pipeline, a number of different steps or processes must be performed to fully decode data encoded in the MPEG-2 format. The video pipeline typically includes bitstream parsing, IDCT, variable length decoding, motion compensation and dequantization). However, in many systems known to the inventors the parsing portion of the decoding pipeline is sometimes performed by a first processor (e.g., a CPU) while the remainder is performed by a second, different processor (e.g., a GPU). Accordingly, encoded video block 304 may already have been parsed (i.e., partially decoded by another device or circuit) prior to being received by decoder 302 and, thus, encoded video block 304 represents an intermediate representation of encoded video data. Alternatively, encoded digital video block 304 may embody a fully encoded video data block.

The decoder 302 passes the domain transformed data 306 on to a sub-block energy level estimator 310. The sub-block energy level estimator 310 produces an all-zero sub-block flag 312 for each sub-block in the video block where the energy level of the sub-block is below a desired threshold (described in detail below).

If the energy level of the sub-block is below the desired threshold, a vector converter 314 produces an encoded sub-block 316 by converting the first motion vector 308 to a second motion vector associated with the second coding scheme for each such sub-block. For example, the vector converter 314 may convert an 8×8 MPEG-2/4 motion vector to a 4×4 H.264 motion vector using a well know conversion algorithm. If all of the individual sub-block energy levels do not exceed the threshold, the vector converter 314 may reuse the original motion vector and code the block as a full size block (e.g., MPEG-2/4 motion vector coded as an 8×8 H.264 block)

The vector converter 314 then provides the encoded sub-block 316 (or full block) to a data consumer 318. For example, the vector converter 314 may pass the encoded sub-block 316 (or full block) to a memory device 208 (e.g., RAM), an output device 216 (e.g., a display), a storage device 218 (e.g., a hard drive) and/or a transceiver 226 (e.g., 802.11 WiFi transmitter).

Figure 4:
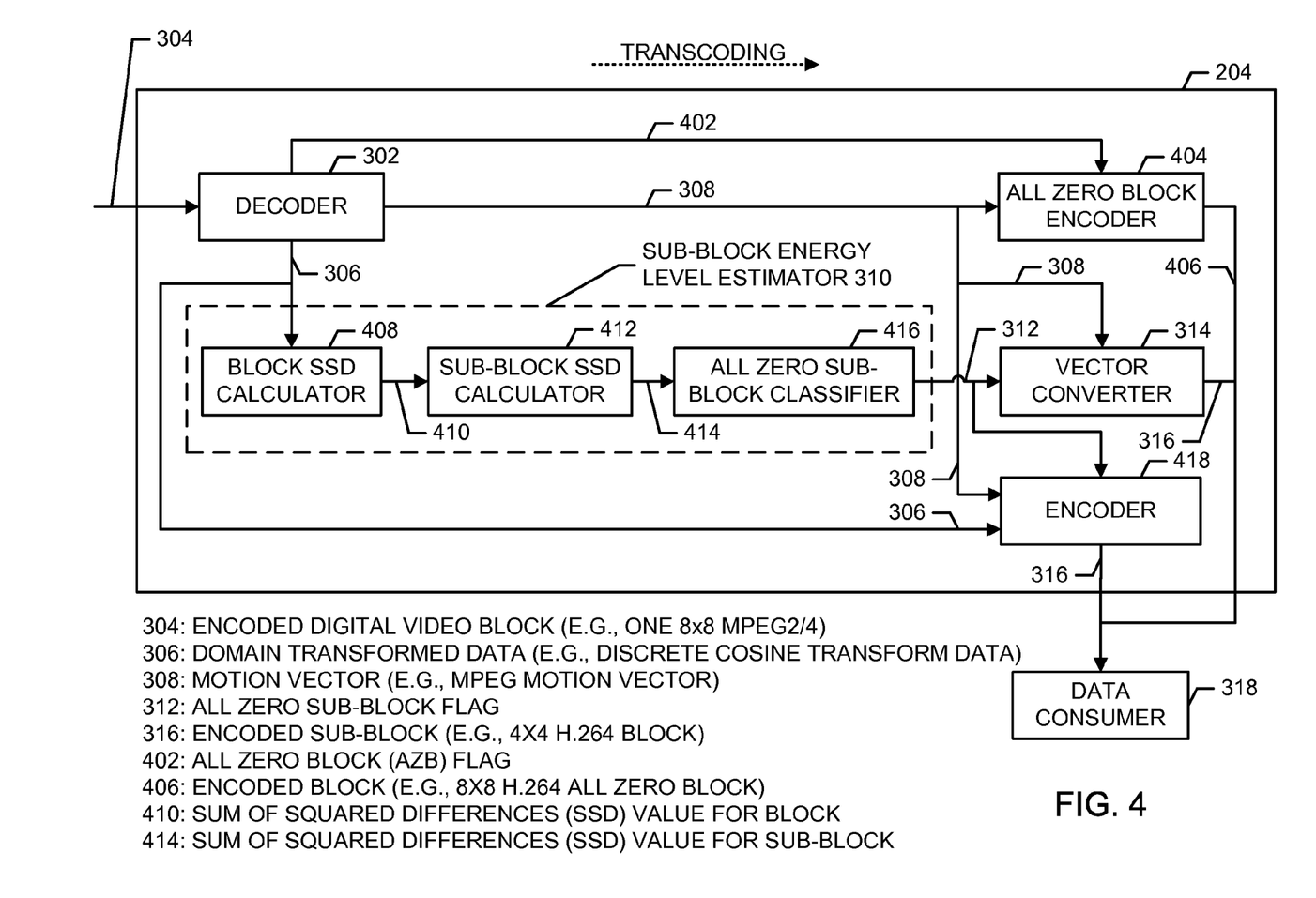
FIG. 4 is a block diagram of another example apparatus for transcoding digital video data.

A block diagram of certain elements of another example transcoder 300 for transcoding digital video data is illustrated in FIG. 4. The transcoder 300 may be implemented in hardware, software (i.e., stored on a computer readable medium and/or executed by hardware such as a CPU), or a combination of hardware and software. In one embodiment the transcoder 300 may be embodied in a GPU and/or a CPU executing software. Other suitable hardware may include one or more application specific integrated circuits (ASICs), state machines, field programmable gate arrays (FPGAs), and/or digital signal processors (DSPs).

In this example, a decoder 302 decodes an encoded digital video block 304 having a first size using a first coding scheme to produce domain transformed data 306, a first motion vector 308, and an all-zero block flag 402 in a well know manner. For example, the decoder 302 may decode an 8×8 MPEG block to produce discrete cosine transform (DCT) data, an MPEG motion vector, and an MPEG all-zero block flag.

The decoder 302 passes the first motion vector 308 and the all-zero block flag 402 associated with the digital video block in the first coding scheme on to an all-zero block encoder 404. If the all-zero block flag 402 classifies the digital video block as an all-zero block, the all-zero block encoder 404 passes an encoded block 406 indicative of the first motion vector 308 in association with the digital video block in a second different coding scheme to a data consumer 318. For example, the all-zero block encoder 404 may provide data indicative of the first motion vector in an 8×8 MPEG-2/4 scheme with the digital video block in an 8×8 H.264 coding scheme to a memory device 208 (e.g., RAM), an output device 216 (e.g., a display), a storage device 218 (e.g., a hard drive) and/or a transceiver 226 (e.g., 802.11 WiFi transmitter).

If the all-zero block flag 402 does not classify the digital video block as an all-zero block, the decoder 302 passes the domain transformed data 306 on to a block SSD calculator 408. The block SSD calculator 408 determines an overall sum-of-squared differences (SSD) value 410 for the digital video block in a well know manner. For example, the block SSD calculator 408 may calculate the overall sum-of-squared differences (SSD) value 410 for an 8×8 MPEG-2 or MPEG-4 block.

Figure 8:
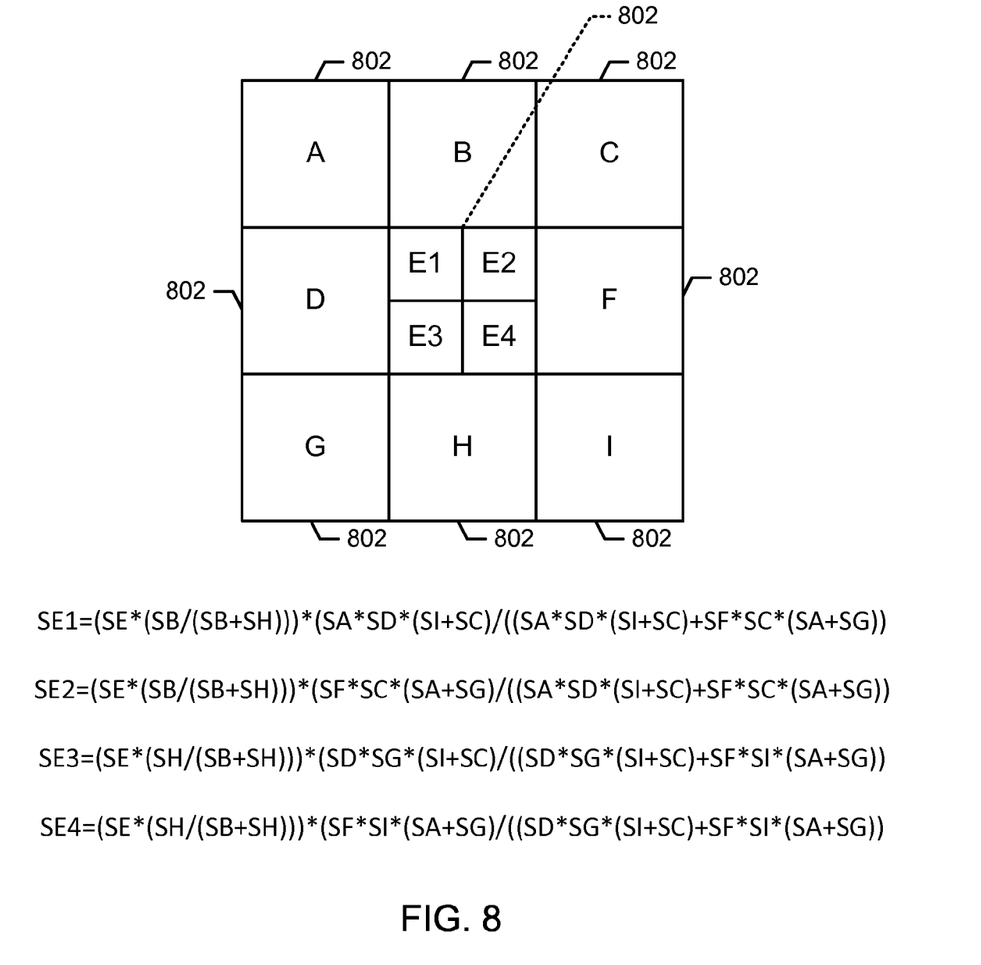
FIG. 8 is a block diagram of a plurality of example video coding blocks, corresponding example sub-blocks, and example formulas to determine each individual sum-of-squared differences value.

The block SSD calculator 408 passes the overall sum-of-squared differences (SSD) value 410 for the digital video block on to a sub-block SSD calculator 412. The sub-block SSD calculator 412 determines a plurality of individual sum-of-squared differences (SSD) values 414 for a plurality of sub-blocks inside the digital video block based on the overall sum-of-squared differences (SSD) values 410 for the current block and the eight surrounding blocks. For example, the sub-block SSD calculator 412 may calculate the plurality of individual sum-of-squared differences (SSD) values in a frequency domain and may calculate the plurality of individual sum-of-squared differences (SSD) values without calculating a motion compensation value. An example of how to determine each individual sum-of-squared differences value is illustrated in FIG. 8.

The sub-block SSD calculator 412 passes the plurality of individual sum-of-squared differences (SSD) values 414 on to an all-zero sub-block classifier 416. The all-zero sub-block classifier 416 produces an all-zero sub-block flag 312 by determining if each individual sum-of-squared differences (SSD) value exceeds a certain threshold. For example, the all-zero sub-block classifier 416 may determine if a 4×4 sub-block is likely an all-zero sub-block by determining if an associated 4×4 sum-of-squared differences (SSD) value is below a certain threshold. For example, the all-zero sub-block classifier 416 may determine the threshold by multiplying a certain constant by a squared quantization value (e.g., $4/3*Qstep^2$). The block SSD calculator 408, sub-block SSD calculator 412, and the all-zero sub-block classifier 416 make up one example of a sub-block energy level estimator 310.

If an individual sum-of-squared differences (SSD) value does not exceed the threshold, a vector converter 314 produces an encoded sub-block 316 by converting the first motion vector to a second motion vector associated with the second coding scheme for each such sub-block. For example, the vector converter 314 may convert an 8×8 MPEG-2/4 motion vector to a 4×4 H.264 motion vector using a well know conversion algorithm. If all of the individual sum-of-squared differences (SSD) values do not exceed the threshold, the vector converter 316 may reuse the original motion vector and code the block as a full size block (e.g., MPEG-2/4 motion vector coded as an 8×8 H.264 block). The vector converter 316 then passes the encoded sub-block 316 (or full block) to the data consumer 318. For example, the vector converter 314 may pass the encoded sub-block 316 (or full block) to a memory device 208 (e.g., RAM), an output device 216 (e.g., a display), a storage device 218 (e.g., a hard drive) and/or a transceiver 226 (e.g., 802.11 WiFi transmitter).

If an individual sum-of-squared differences (SSD) value does exceed the threshold, an encoder 418 encodes each such sub-block using the second coding scheme. For example, the encoder 418 may encode a 4×4 sub-block using the full H.264 motion estimation and residue encoding procedure as is well known in the art. The encoder 418 then passes the encoded sub-block 316 to the data consumer 318. For example, the encoder 418 may pass the encoded sub-block 316 to a memory device 208 (e.g., RAM), an output device 216 (e.g., a display), a storage device 218 (e.g., a hard drive) and/or a transceiver 226 (e.g., 802.11 WiFi transmitter).

Figure 5:
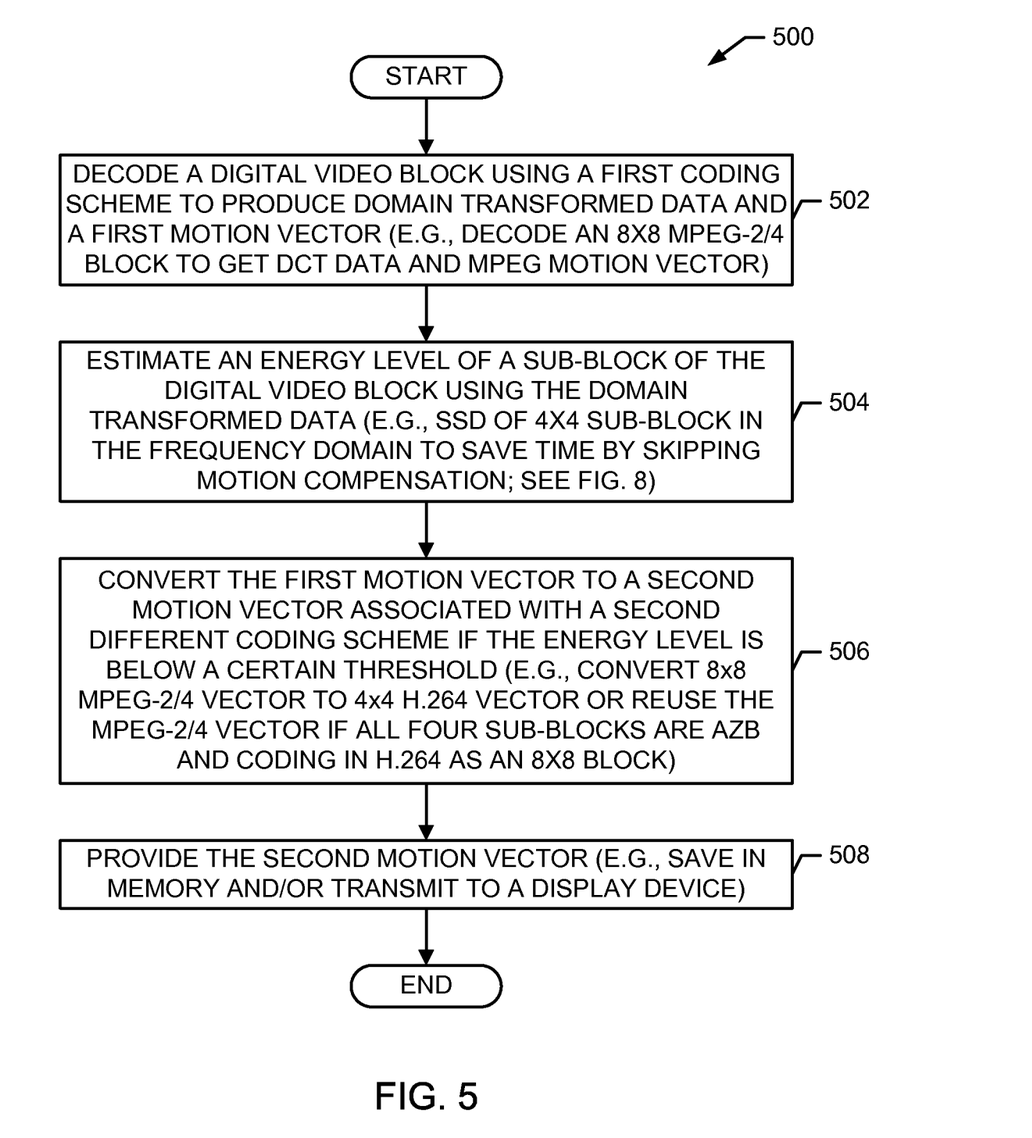
FIG. 5 is a flowchart of an example process for transcoding digital video data.

A flowchart of an example process 500 for transcoding digital video data is illustrated in FIG. 5. The process 500 may be carried out by one or more suitably programmed processors such as a GPU and/or a CPU executing software (e.g., block 204 of FIG. 2). The process 500 may also be embodied in hardware, software (i.e., stored on a computer readable medium and/or executed by hardware such as a CPU), or a combination of hardware and software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In general, a transcoder 300 decodes a digital video block using a first coding scheme, such as 8×8 MPEG-2/4, to produce domain transformed data and a motion vector. The transcoder 300 then estimates an energy level of each sub-block in the digital video block in the frequency domain (as opposed to the spatial domain), thereby reducing or eliminating the need for motion compensation. For each sub-block with an estimated energy level below a desired threshold (e.g., likely an all-zero sub-block), the transcoder 300 transcodes the sub-block by converting the motion vector from the first coding scheme (e.g., MPEG-2/4) to the second coding scheme (e.g., H.264) (e.g., convert 8×8 MPEG-2/4 vector to 4×4 H.264 vector or reuse the MPEG-2/4 vector if all four sub-blocks are AZB and coding in H.264 as an 8×8 block). The transcoded sub-block may then be used (e.g., stored or transmitted).

More specifically, the example process 500 begins when the transcoder 300 decodes a digital video block using a first coding scheme to produce domain transformed data and a first motion vector (block 502). For example, the transcoder 300 may decode an 8×8 MPEG-2 or MPEG-4 digital video block to produce discrete cosine transform (DCT) data and an MPEG motion vector.

The transcoder 300 then estimates an energy level of each sub-block of the digital video block using the domain transformed data (block 504). For example, the transcoder 300 may calculate a sum-of-squared differences (SSD) of 4×4 sub-block in the frequency domain to save time by skipping motion compensation as described in detail below.

The transcoder 300 then converts the first motion vector to a second motion vector associated with the second coding scheme if the energy level is below a certain threshold (block 506). For example, the transcoder 300 may convert an 8×8 MPEG-2/4 motion vector to a H.264 motion vector. If all of the individual sum-of-squared differences (SSD) values do not exceed the threshold, the transcoder 300 may reuse the original motion vector and code the block as a full size block (MPEG-2/4 motion vector coded as an 8×8 H.264 block).

The transcoder 300 then provides the second motion vector (block 508). For example, the transcoder 300 may provide data for four 4×4 H.264 blocks or one 8×8 H.264 block to a data consumer 318. For example, transcoder 300 may provide the encoded block or sub-blocks to a memory device 208 (e.g., RAM), an output device 216 (e.g., a display), a storage device 218 (e.g., a hard drive) and/or a transceiver 226 (e.g., 802.11 WiFi transmitter).

Figure 6:
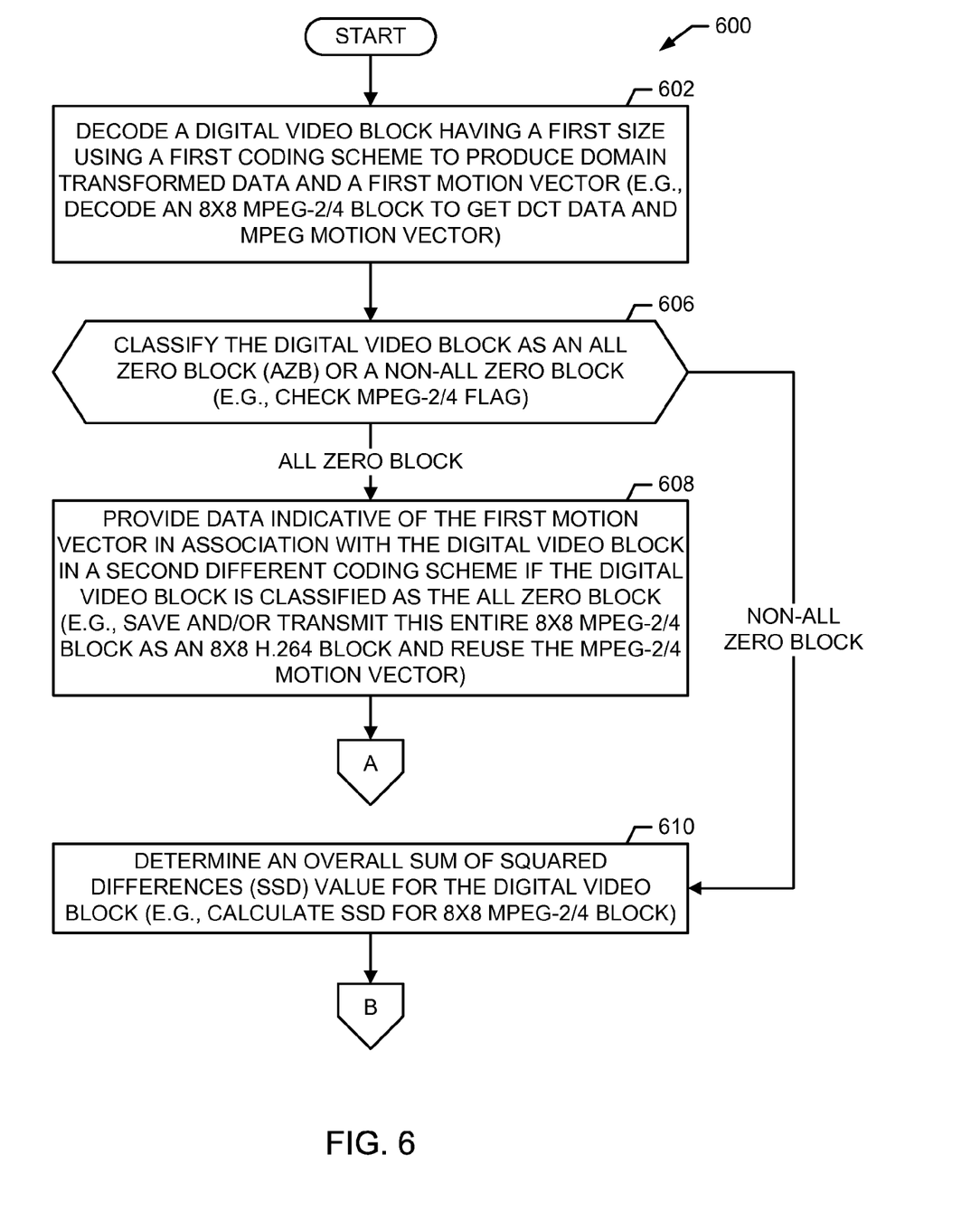
FIG. 6 and FIG. 7 are a flowchart of another example process for transcoding digital video data.
Figure 7:
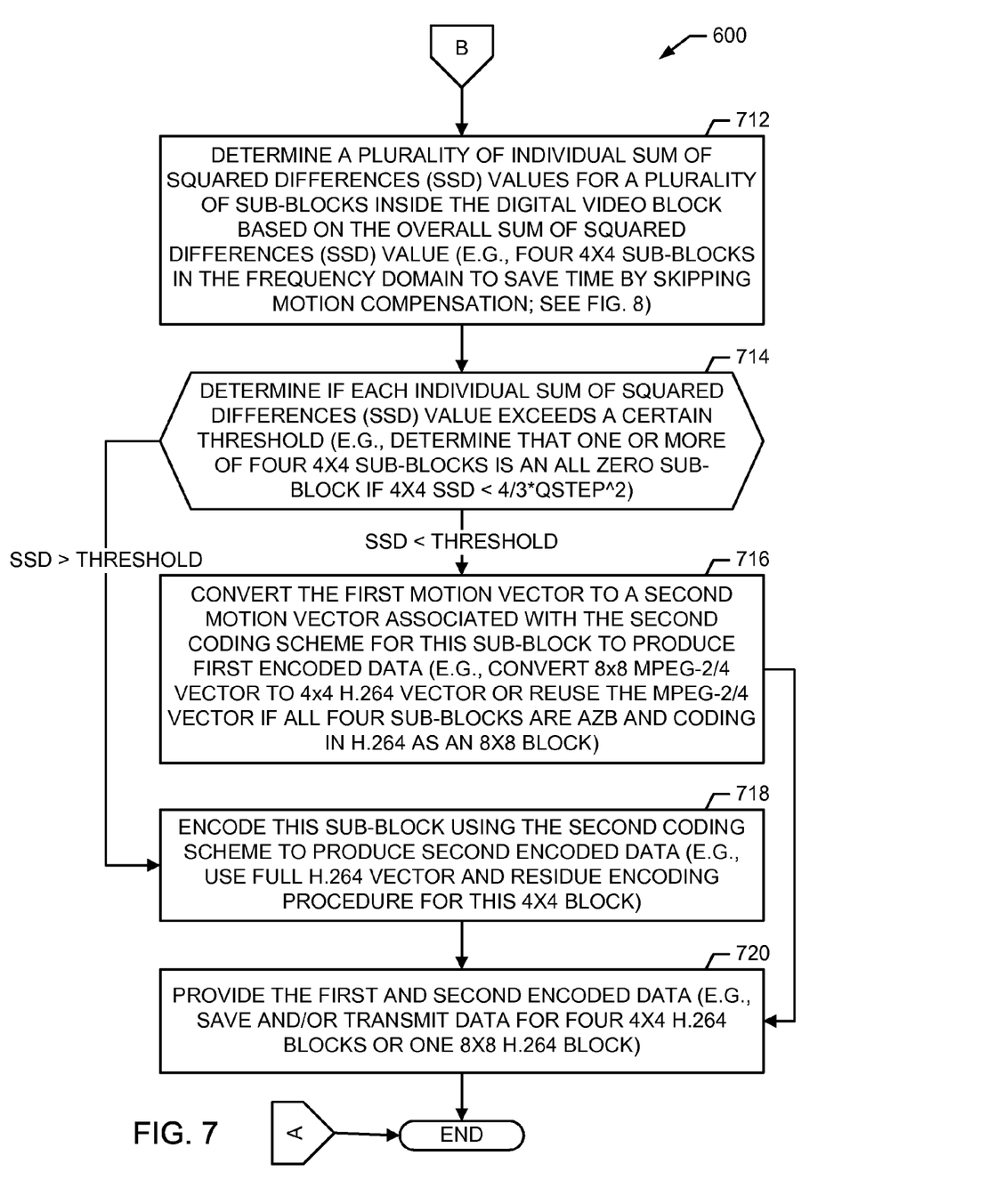

A flowchart of an example process 600 for transcoding digital video data is illustrated in FIG. 6 and FIG. 7. The process 600 may be carried out by one or more suitably programmed processors such as a GPU and/or a CPU executing software (e.g., block 204 of FIG. 2). The process 600 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIGS. 6-7, it will be appreciated that many other methods of performing the acts associated with process 600 may be used. For example, the order of many of the operations may be changed, and some of the operations described may be optional.

In general, a transcoder 300 decodes a digital video block using a first coding scheme, such as 8×8 MPEG-2/4, to produce domain transformed data, a motion vector, an all-zero block (AZB) flag. If the digital video block is an all-zero block, the transcoder 300 transcodes the block by reusing the motion vector from the first coding scheme (e.g., MPEG-2/4) in the second coding scheme (e.g., H.264). If the block is not an all-zero block, the transcoder 300 determines an overall sum-of-squared differences (SSD) value for the block and a plurality of individual sum-of-squared differences (SSD) values for a plurality of sub-blocks (e.g., four 4×4 sub-blocks) inside the block. Doing so produces an estimation of a sub-block being an all-zero sub-block in the frequency domain (as opposed to the spatial domain), thereby reducing or eliminating the need for motion compensation. For each individual sum-of-squared differences (SSD) value that is less than a certain threshold (e.g., a all-zero sub-block), the transcoder 300 transcodes the sub-block by converting the motion vector from the first coding scheme (e.g., MPEG-2/4) to the second coding scheme (e.g., H.264) (e.g., convert 8×8 MPEG-2/4 vector to 4×4 H.264 vector or reuse the MPEG-2/4 vector if all four sub-blocks are AZB and coding in H.264 as an 8×8 block). For each individual sum-of-squared differences (SSD) value that exceeds the threshold, the transcoder 300 encodes the sub-block using the second coding scheme (e.g., use full H.264 vector and residue encoding procedure for this 4×4 block).

More specifically, the example process 600 begins when the transcoder 300 decodes a digital video block having a first size using a first coding scheme to produce domain transformed data and a first motion vector (block 602). For example, the transcoder 300 may decode an 8×8 MPEG-2 or MPEG-4 digital video block to produce discrete cosine transform (DCT) data and an MPEG motion vector.

The transcoder 300 then classifies the digital video block as an all-zero block or a non-all-zero block (block 606). For example, the transcoder 300 may classify the digital video block based on an all-zero block flag produced by decoding the digital video block using the first coding scheme. The transcoder 300 then provides data indicative of the first motion vector in association with the digital video block in a second different coding scheme if the digital video block is classified as the all-zero block (block 608). For example, if the digital video block is an all-zero block, the transcoder 300 may provide data indicative of the first motion vector with the digital video block in a H.264 coding scheme to a data consumer 318. For example, transcoder 300 may provide the encoded block to a memory device 208 (e.g., RAM), an output device 216 (e.g., a display), a storage device 218 (e.g., a hard drive) and/or a transceiver 226 (e.g., 802.11 WiFi transmitter).

If the digital video block is not an all-zero block, the transcoder 300 determines an overall sum-of-squared differences (SSD) value for the digital video block (block 610). For example, the transcoder 300 may calculate the overall sum-of-squared differences (SSD) value for an 8×8 MPEG-2/4 digital video block. The transcoder 300 then determines a plurality of individual sum-of-squared differences (SSD) values for a plurality of sub-blocks inside the digital video block based on the overall sum-of-squared differences (SSD) value (block 712). For example, the transcoder 300 may calculate the plurality of individual sum-of-squared differences (SSD) values in a frequency domain without calculating a motion compensation value. An example of how to determine each individual sum-of-squared differences value is illustrated in FIG. 8.

The transcoder 300 then determines if each individual sum-of-squared differences (SSD) value exceeds a certain threshold (block 714). For example, the transcoder 300 may determine if a 4×4 sub-block is an all-zero sub-block by determining if an associated 4×4 sum-of-squared differences (SSD) value is below the certain threshold. The transcoder 300 may determine the threshold by multiplying a certain constant by a squared quantization value (e.g., 4/3*Q step^2).

The transcoder 300 then converts the first motion vector to a second motion vector associated with the second coding scheme for each sub-block associated with an individual sum-of-squared differences (SSD) value that does not exceed the certain threshold (block 716). For example, the transcoder 300 may convert an 8×8 MPEG-2/4 motion vector to a H.264 motion vector. If all of the individual sum-of-squared differences (SSD) values do not exceed the threshold, the transcoder 300 may reuse the original motion vector and code the block as a full size block (MPEG-2/4 motion vector coded as an 8×8 H.264 block).

The transcoder 300 then encodes each sub-block using the second coding scheme for each sub-block associated with an individual sum-of-squared differences (SSD) value that exceeds the certain threshold (block 718). For example, the encoder 218 may encode a 4×4 sub-block using the full H.264 vector and residue encoding procedure. The transcoder 300 then provides data indicative of the digital video block in the second coding scheme (block 720). For example, the transcoder 300 may provide data for four 4×4 H.264 blocks or one 8×8 H.264 block to a data consumer 318. For example, transcoder 300 may provide the encoded block or sub-blocks to a memory device 208 (e.g., RAM), an output device 216 (e.g., a display), a storage device 218 (e.g., a hard drive) and/or a transceiver 226 (e.g., 802.11 WiFi transmitter).

A block diagram of a plurality of example video coding blocks, corresponding example sub-blocks, and example formulas to determine each individual sum-of-squared differences value is illustrated in FIG. 8. In this example, nine video coding blocks 802 represent a portion of a video frame. For example, each block 802 may be an 8×8 MPEG-2/4 block. The overall sum-of-squared differences (SSD) value for one block 802 in the pixel domain may be determined in the transform domain according to Paseval's energy conservation theorem in a well know manner. Each overall SSD is represented in the formulas of FIG. 8 as SA, SB, SC, SD, SE, SF, SG, SH, and SI. By way of illustration only, the center block 802 is further divided in to four sub-blocks E1, E2, E3, and E4. For example, each sub-block may be a 4×4 sub-block. The individual sum-of-squared differences (SSD) value (SE1, SE2, SE3, and SE4) for each sub-block may be determined based on the overall SSDs using the illustrated formulas.

In summary, persons of ordinary skill in the art will readily appreciate that methods and apparatus for transcoding digital video data have been provided. Among other advantages, eliminating the need for motion estimation and residue determination by converting the motion vector from a first coding scheme to a motion vector in a second coding scheme for each low energy sub-block (e.g., likely all-zero sub-block) saves computational power during the transcoding process. Saving computational power during the transcoding process allows higher quality digital video to be displayed in real-time with fewer processing resources.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of transcoding digital video data, the method comprising:
   decoding a digital video block using a first coding standard to produce domain transformed data and a first motion vector;
   estimating an energy level of a sub-block of the digital video block using the domain transformed data;
   converting the first motion vector to a second motion vector associated with a second different coding standard when the energy level is below a certain threshold; and
   providing the second motion vector.

2. The method of claim 1, wherein estimating the energy level of the sub-block includes estimating the energy level of the sub-block in a frequency domain.

3. The method of claim 1, wherein estimating the energy level of the sub-block includes estimating the energy level of the sub-block without calculating a motion compensation value associated with the digital video block.

4. The method of claim 1, wherein estimating the energy level of the sub-block includes determining an overall sum-of-squared differences (SSD) value for the digital video block.

5. The method of claim 4, wherein estimating the energy level of the sub-block includes determining a plurality of individual sum-of-squared differences (SSD) values for a plurality of sub-blocks inside the digital video block based on the overall sum-of-squared differences (SSD) value.

6. The method of claim 5, further comprising determining when the energy level is below the certain threshold by determining when an individual sum-of-squared differences (SSD) value in the plurality of individual sum-of-squared differences (SSD) values is indicative of an all-zero sub-block.

7. The method of claim 1, wherein providing the second motion vector includes encoding the digital video block using the second coding standard and at least one of storing the digital video block in a memory and transmitting the digital video block.

8. The method of claim 7, further comprising:
   receiving the digital video block;
   decoding the digital video block using the second coding standard; and
   displaying the digital video block.

9. An apparatus for transcoding digital video data, the apparatus comprising:
   a decoder structured to decode a digital video block to produce domain transformed data and a first motion vector;
   a sub-block energy level estimator operatively coupled to the decoder, the sub-block energy level estimator being structured to estimate an energy level of a sub-block of the digital video block using the domain transformed data;
   a vector converter operatively coupled to the sub-block energy level estimator, the vector converter being structured to convert the first motion vector to a second motion vector associated with a second different coding standard when the energy level is below a certain threshold; and
   a data provider operatively coupled to the vector converter, the data provider being structured to provide the second motion vector.

10. The apparatus of claim 9, wherein the sub-block energy level estimator is structured to estimate the energy level of the sub-block by estimating the energy level of the sub-block in a frequency domain.

11. The apparatus of claim 9, wherein the sub-block energy level estimator is structured to estimate the energy level of the sub-block without calculating a motion compensation value associated with the digital video block.

12. The apparatus of claim 9, wherein the sub-block energy level estimator is structured to estimate the energy level of the sub-block by determining an overall sum-of-squared differences (SSD) value for the digital video block.

13. The apparatus of claim 12, wherein the sub-block energy level estimator is structured to estimate the energy level of the sub-block by determining a plurality of individual sum-of-squared differences (SSD) values for a plurality of sub-blocks inside the digital video block based on the overall sum-of-squared differences (SSD) value.

14. The apparatus of claim 13, wherein the sub-block energy level estimator is structured to estimate the energy level of the sub-block by determining when an individual sum-of-squared differences (SSD) value in the plurality of individual sum-of-squared differences (SSD) values is indicative of an all-zero sub-block.

15. The apparatus of claim 9, wherein the data provider is structured to transmit the digital video block encoded using the second coding standard.

16. The apparatus of claim 15, further comprising:
a receiver structured to receive the digital video block;
a decoder structured to decode the digital video block using the second coding standard;
and a display structured to display the digital video block.

17. A method of transcoding digital video data, the method comprising:
decoding a digital video block having a first size using a first coding scheme to produce domain transformed data and a first motion vector;
classifying the digital video block as at least one of an all-zero block and a non-all-zero block based on the domain transformed data;
providing data indicative of the first motion vector in association with the digital video block in a second different coding scheme when the digital video block is classified as the all-zero block;
if the digital video block is classified as the non-all-zero block:
determining an overall sum-of-squared differences (SSD) value for the digital video block;
determining a plurality of individual sum-of-squared differences (SSD) values for a plurality of sub-blocks inside the digital video block based on the overall sum-of-squared differences (SSD) value;
determining when each individual sum-of-squared differences (SSD) value is beyond a certain threshold;
converting the first motion vector to a second motion vector associated with the second coding scheme for each sub-block associated with an individual sum-of-squared differences (SSD) value that is not beyond the certain threshold to produce first encoded data;
encoding each sub-block using the second coding scheme for each sub-block associated with an individual sum-of-squared differences (SSD) value that is beyond the certain threshold to produce second encoded data; and
provide the first encoded data and the second encoded data.

18. The method of claim 1, wherein determining the plurality of individual sum-of-squared differences (SSD) values includes determining the plurality of individual sum-of-squared differences (SSD) values in a frequency domain.

19. The method of claim 17, wherein determining the plurality of individual sum-of-squared differences (SSD) values includes determining the plurality of individual sum-of-squared differences (SSD) values without calculating a motion compensation value associated with the digital video block.

20. The method of claim 17, wherein determining when each individual sum-of-squared differences (SSD) value that is beyond a certain threshold includes determining the threshold by multiplying a certain constant by a squared quantization value.

21. The method of claim 17, wherein decoding the digital video block includes decoding an 8×8 digital video block.

22. The method of claim 17, wherein classifying the digital video block as an all-zero block or a non-all-zero block includes classifying the digital video block based on a all-zero block flag produced by decoding the digital video block using the first coding scheme.

23. The method of claim 17, wherein determining the overall sum-of-squared differences (SSD) value for the digital video block includes determining the overall sum-of-squared differences (SSD) value for an 8×8 digital video block.

24. The method of claim 17, wherein determining when each individual sum-of-squared differences (SSD) value that is beyond the certain threshold includes determining when a 4×4 sub-block is an all-zero sub-block by determining when an associated 4×4 sum-of-squared differences (SSD) value is below the certain threshold.

25. The method of claim 17, wherein converting the first motion vector to the second motion vector includes converting an 8×8 motion vector to a 4×4 motion vector.

26. The method of claim 17, wherein encoding each sub-block using the second coding scheme includes encoding a 4×4 digital video block.

27. The method of claim 17, wherein storing data indicative of the digital video block in the second coding scheme includes storing a 4×4 digital video block.

28. An apparatus for transcoding digital video data, the apparatus comprising:
a decoder structured to decode a digital video block having a first size using a first coding scheme to produce domain transformed data and a first motion vector;
an all-zero block classifier operatively coupled to the decoder, the all-zero block classifier being structured to classify the digital video block as at least one of an all-zero block and a non-all-zero block;
a memory operatively coupled to the all-zero block classifier, the memory being structured to store data indicative of the first motion vector in association with the digital video block in a second different coding scheme when the digital video block is classified as the all-zero block;
a block SSD calculator operatively coupled to the decoder, the block SSD calculator being structured to calculate an overall sum-of-squared differences (SSD) value for the digital video block;
a sub-block SSD calculator operatively coupled to the block SSD calculator, the sub-block SSD calculator being structured to calculate a plurality of individual sum-of-squared differences (SSD) values for a plurality of sub-blocks inside the digital video block based on the overall sum-of-squared differences (SSD) value;

an all-zero sub-block classifier operatively coupled to the sub-block SSD calculator, the all-zero sub-block classifier being structured to determine when each individual sum-of-squared differences (SSD) value is beyond a certain threshold;

a vector converter operatively coupled to the all-zero sub-block classifier, the vector converter being structured to convert the first motion vector to a second motion vector associated with the second coding scheme for each sub-block associated with an individual sum-of-squared differences (SSD) value that is not beyond the certain threshold; and an encoder operatively coupled to the all-zero sub-block classifier, the encoder being structured to encode each sub-block using the second coding scheme for each sub-block associated with an individual sum-of-squared differences (SSD) value that is beyond the certain threshold;

wherein the memory is operatively coupled to the encoder and the vector converter, and the memory is structured to store data indicative of the digital video block in the second coding scheme.

29. The apparatus of claim 28, wherein the sub-block SSD calculator is structured to calculate the plurality of individual sum-of-squared differences (SSD) values in a frequency domain.

30. The apparatus of claim 28, wherein the sub-block SSD calculator is structured to calculate the plurality of individual sum-of-squared differences (SSD) values without calculating a motion compensation value.

31. The apparatus of claim 28, wherein the all-zero sub-block classifier is structured to determine the threshold by multiplying a certain constant by a squared quantization value.

32. The apparatus of claim 28, wherein the decoder is structured to decode an 8×8 digital video block.

33. The apparatus of claim 28, wherein the all-zero block classifier is structured to classify the digital video block based on an all-zero block flag produced by decoding the digital video block using the first coding scheme.

34. The apparatus of claim 28, wherein the block SSD calculator is structured to calculate the overall sum-of-squared differences (SSD) value for an 8×8 digital video block.

35. The apparatus of claim 28, wherein the all-zero sub-block classifier is structured to determine when a 4×4 sub-block is an all-zero sub-block by determining when an associated 4×4 sum-of-squared differences (SSD) value is below the certain threshold.

36. The apparatus of claim 28, wherein the vector converter is structured to convert an 8×8 motion vector to a 4×4 motion vector.

37. The apparatus of claim 28, wherein the encoder is structured to encode a 4×4 digital video block.

38. The apparatus of claim 28, wherein the memory is structured to store a 4×4 digital video block.

39. A non-transitive computer readable media storing information structured to cause an apparatus to:
decode a digital video block using a first coding standard to produce domain transformed data and a first motion vector;
estimate an energy level of a sub-block of the digital video block using the domain transformed data;
convert the first motion vector to a second motion vector associated with a second different coding standard when the energy level is below a certain threshold; and
provide the second motion vector.

40. The computer readable media of claim 39, wherein the information is structured to cause the apparatus to estimate the energy level of the sub-block in a frequency domain.

41. The computer readable media of claim 39, wherein the information is structured to cause the apparatus to estimate the energy level of the sub-block without calculating a motion compensation value associated with the digital video block.

42. The computer readable media of claim 39, wherein the information is structured to cause the apparatus to estimate the energy level of the sub-block by determining an overall sum-of-squared differences (SSD) value for the digital video block.

43. A portion of an encoded video file prepared by a process comprising:
decoding a digital video block using a first coding standard to produce domain transformed data and a first motion vector;
estimating an energy level of a sub-block of the digital video block using the domain transformed data;
converting the first motion vector to a second motion vector associated with a second different coding standard when the energy level is below a certain threshold; and
providing the second motion vector.

44. The portion of the encoded video file of claim 43, wherein estimating the energy level of the sub-block includes estimating the energy level of the sub-block in a frequency domain.

45. The portion of the encoded video file of claim 43, wherein estimating the energy level of the sub-block includes estimating the energy level of the sub-block without calculating a motion compensation value associated with the digital video block.

46. The portion of the encoded video file of claim 43, wherein estimating the energy level of the sub-block includes determining an overall sum-of-squared differences (SSD) value for the digital video block.

* * * * *